United States Patent [19]

Spradling

[11] 4,103,212
[45] Jul. 25, 1978

[54] TWO SPEED SINGLE PHASE INDUCTION MOTOR

[75] Inventor: Gene V. Spradling, Glendale, Mo.

[73] Assignee: Emerson Electric Co., St. Louis, Mo.

[21] Appl. No.: 723,990

[22] Filed: Sep. 16, 1976

[51] Int. Cl.² .......................................... H02K 17/08
[52] U.S. Cl. ................................ 318/224 A; 310/184
[58] Field of Search ............... 318/224 A, 224 R, 138, 318/254, 220 B; 310/184, 180, 198

[56] References Cited

U.S. PATENT DOCUMENTS

| 3,153,184 | 10/1964 | Stout | 318/224 A |
| 3,359,476 | 12/1967 | Charlton | 318/224 A |
| 3,887,854 | 6/1975 | Parks | 318/224 A |

*Primary Examiner*—Herman J. Hohauser
*Attorney, Agent, or Firm*—Polster, Polster and Lucchesi

[57] ABSTRACT

A dynamoelectric machine in the form of an induction motor provides two speed operation with a minimum number of motor leads and a minimum number of motor windings. The motor includes a stator assembly having a core of magnetic material. The core has a plurality of slots formed in it. The motor windings are carried in the slots. The motor windings include a main winding, a first auxiliary winding and a second auxiliary winding. The main inding and one of the auxiliary windings have an equal number of electrical and physical poles. The second auxiliary winding has twice the number of physical poles as the main winding. First speed operation is attained by electrically energizing the main winding with the first auxiliary winding. Second speed operation is attained by interconnecting the main winding so that it produces two consequent physical poles resulting in four electrical poles and energizing the second auxiliary winding for operation with the reconnected main winding.

10 Claims, 4 Drawing Figures

TWO SPEED SINGLE PHASE INDUCTION MOTOR

BACKGROUND OF THE INVENTION

This invention relates to dynamoelectric machines, and in particular, to single phase induction motors. While the invention is described with particular reference to motors utilized in hermetic compressor applications, those skilled in the art will recognize the wider applicability of the inventive principles disclosed hereinafter.

There long has been a need for economical and efficient equipment in residential air conditioning applications. For example, in the past, it has been difficult to determine the proper size of available air conditioning equipment so that the installed equipment has ample capacity for peak load conditions, yet operates efficiently and provides suitable room temperature at light load conditions. Prior art attempts to solve the sizing problem generally make use of mechanical unloading devices in conjunction with the air conditioning or refrigeration system, for example, in order to provide proper regulation of the system. The terms refrigeration and air conditioning are used in their broadest generic sense, and are intended to include any system having a hermetic compressor as an element.

More recently, attempts have been made to modulate the compressor of the refrigeration system by operating the compressor at two distinct speeds. One solution to the motor design problem involving a modulated compressor application is disclosed in the co-pending application to Robert A. Landgraf, Ser. No. 723,989, filed Sept. 16, 1976, assigned to the assignor of the present invention, which is intended to be incorporated by reference herein.

Multi-speed motors are known in the art. In the past, multi-speed motors generally have been constructed by placing a plurality of distinct windings within a stator core, and thereafter switching between sets of distinct windings to vary motor speed. That is to say, for the purposes of this specification, "distinct windings" is defined to mean that each main winding physical pole of the dynamoelectric machine has a corresponding auxiliary winding physical pole that is energized only in conjunction with its main winding physical pole. In such multiple speed motors, the number of main winding poles equals the number of auxiliary winding poles, the poles of the main and auxiliary windings being physically displaced with respect to one another in order to generate the revolving field of the induction device.

While such multi-speed motor constructions work well for their intended purposes, they normally have been utilized in applications where slot fill of the motor is not critical. Slot fill is a term of art, and generally is expressed as a precentage of the total usuable slot area displaced by the motor windings for each slot of the particular lamination design used in constructing the core of the stator assembly. In many induction motor applications, slot fills are not critical, and ample slot space is provided in the lamination design for carrying a number of motor windings.

Hermetic motors, on the other hand, usually have high slot fill concentrations. One of the reasons for the high slot fill concentration is that motor performance and efficiency can be improved by utilizing additional material in the motor design, particularly by reducing the flux density of the core, either by increasing stack height or increasing the number of motor turns. Performance and efficiency can be varied in a number of other ways. As indicated, the number of turns used in a particular winding may be increased, or the winding resistance may be reduced by increasing the wire size used in the motor design. Both of these steps increase the physical space requirement of the winding. One or more of these design techniques commonly is used in hermetic motor developments in order to meet performance standards. Consequently, hermetic motors in general exhibit the highest slot fill percentages of all motor applications. For that reason, use of distinct multiple motor windings for attaining a multiple speed motor is not a practical design expedient.

An additional factor affecting the design of hermetic motors is the fact that the hermetic motor in use is enclosed and hermetically sealed in the compressor unit of the refrigeration system. Electrical connections for energizing the motor are made through the shell or enclosure of the compressor. The shell has a connection opening made in it, and a special connector that preserves the integrity of the refrigerant system is inserted in and hermetically seals the opening. The use and insertion of the connectors in the shells adds significantly to the compressor cost. Consequently, a general design requirement is that motors utilized in hermetic compressors be capable of electrical energization through a minimum number of leads in order to minimize problems encountered in making multiple openings through the compressor shell and resealing those openings with suitable connectors.

The motor design disclosed hereinafter meets these stringent design criteria by providing a multiple speed motor having a minimum number of motor leads, the motor exhibiting comparable performance at rated loads on either speed. In the preferred embodiment, the stator assembly of the motor has a single main winding constructed from a plurality of coil sets inserted in the slots of the stator core. The coil sets of the main winding define two physical motor poles. A first auxiliary winding and a second auxiliary winding also are provided, each being constructed from a plurality of coil sets. The coil sets of the first auxiliary winding also define two physical poles, while the coil sets of the second auxiliary winding define four physical poles. When two pole motor operation is desired, the main winding and two pole auxiliary winding are energized and the motor operates in a conventional manner as a two pole induction motor. When four pole operation is desired, the main winding is reconnected so that the polarities of the two physical motor poles produce four electrical motor poles, and the second auxiliary winding is energized. Thereafter, the motor operates as a four pole motor.

Those skilled in the art will recognize that interconnection and energization of the various windings may be accomplished automatically by suitable switching means. The arrangement disclosed utilizes a minimum number of windings, and requires only five external leads for passage through the compressor shell. The use of five leads on the motor results in a switch design more simplified and less costly over what would be required to change motor operating speed if the number of leads exceeded five.

One of the objects of this invention is to provide a multi-speed induction motor having a single main winding, and a pair of auxiliary windings, the single main winding being connected with respect ones of the auxiliary windings to provide two speed operation of the motor.

Another object of this invention is to provide a two speed hermetic motor for utilization in refrigeration compressors.

Yet another object of this invention is to provide a multi-speed motor having a minimum number of windings leads.

Another object of this invention is to provide a multi-speed motor in which a single main winding is utilized with multiple auxiliary windings.

Still another object of this invention is to provide an induction motor providing more efficient operation of a refrigeration system.

Other objects of this invention will be apparent to those skilled in the art in light of the following description and accompanying drawings.

SUMMARY OF THE INVENTION

In accordance with this invention, generally stated, an induction motor is provided having multi-speed capabilities with a minimum winding arrangement. The motor includes a single main winding defining a first number of physical motor poles, a first auxiliary winding defining the same number of physical motor poles as the main winding, and a second auxiliary winding defining twice the number of physical motor poles as the main winding. The main winding and the first auxiliary winding are energized to obtain a first motor speed. The polarity and interconnection of the two main winding physical poles are changed when that winding is used in conjunction with the second auxiliary winding so that the main winding produces two consequent physical poles resulting in four electrical poles, the motor operating at a second speed under these conditions.

DESCRIPTION OF THE PREFERRED EMBODIMENT

Figure 1:
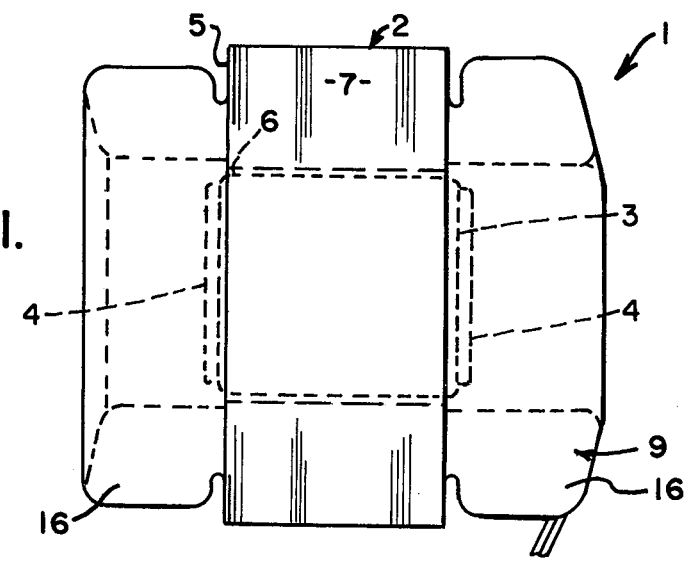
FIG. 1 is a view in side elevation of one illustrative embodiment of dynamoelectric machine employing my invention.

Referring now to FIG. 1, reference numeral 1 indicates an induction motor which may be of a variety of types, and suited for a variety of applications. The particular motor 1 shown is a hermetic motor which, as will be appreciated by those skilled in the art, comprises a stator assembly 2 and a rotor assembly 3. A hermetic motor conventionally is supplied to original hermetic compressor manufacturers as "motor parts," in that the stator and rotor assembly are supplied independently of one another for insertion and interconnection in the compressor. Other motor types conventionally are manufactured as a unit within a self-contained enclosure and require only the application of electrical energy for operation.

The rotor assembly 3 generally includes a plurality of stacked laminations constructed from suitable magnetic material. Individual laminations conventionally have a central opening through them, which defines an opening through the rotor assembly for receiving a motor shaft, not shown. The shaft for hermetic motors commonly is provided by the compressor manufacturer, and the rotor assembly 3 is fitted to the shaft during compressor construction. The rotor 3 preferably is a conventional squirrel cage design, and the laminations of the rotor assembly 3 have a plurality of slots in them, which receive the cast rotor bars of the squirrel cage. The rotor bars are terminated along the outboard faces of the laminations along the end rings 4 in a conventional manner. The rotor assembly 3 as thus described, is conventional and does not form a part of the invention hereinafter.

The stator assembly 2 also is constructed from a plurality of individual laminations 5. Each of the laminations 5 has a central opening through it, which defines a bore 6 when the laminations are arranged in stacked relationship to define a stator core 7. The laminations are fixed in stacked relationship by any convenient method. Welding, cleating and epoxy bond, singly or in combination, are common expedients used in core 7 construction. The bore 6 is sized to receive the rotor assembly 3 and to provide a predetermined air gap between the inner diameter of the core 7 and the outer diameter of the rotor assembly 3.

Figure 2:
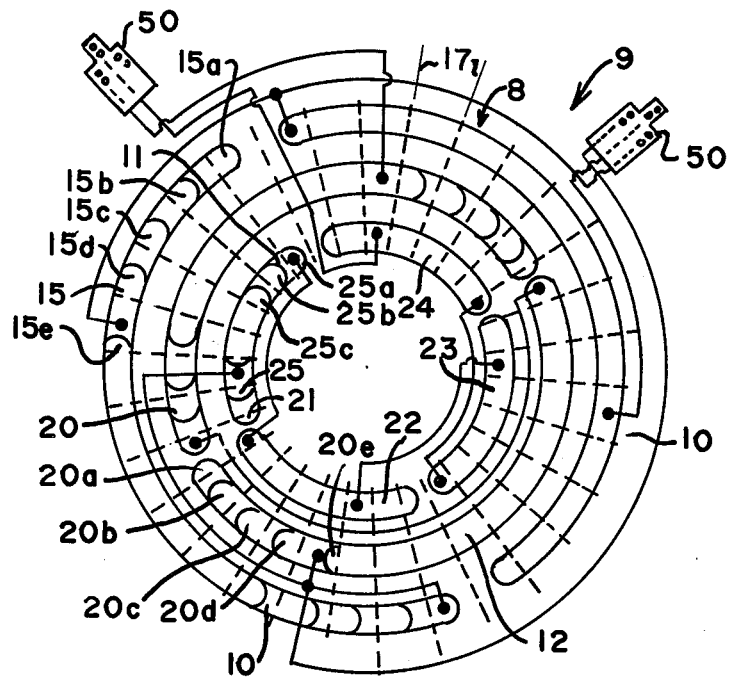
FIG. 2 is an illustrative connection diagram showing coil placement for one winding embodiment of this invention.

The stator core 7 also has a plurality of receptacles, not shown, which conventionally extend radially outwardly from the bore 6 and communicate with the bore along one end of the receptacles. When aligned in the core 7, the receptacles define a plurality of winding receiving slots 8, successive slots being separated by a stator tooth 17. The slots 8 and teeth 17 are illustrated diagrammatically in FIG. 2. The particular lamination design represented in FIG. 2 has 30 of the slots 8 associated with it. Those skilled in the art will recognize that lamination design, slot size, and slot number, for example, all may vary in other embodiments of this invention. The slots 8 receive a motor winding 9 in a conventional manner. The winding 9, in the example illustrated in the drawings, includes a single main winding 10, a first auxiliary winding 11 and a second auxiliary winding 12.

The main winding 10 has two physical winding poles, respective poles being delineated by a first winding part 13 and a second winding part 14. The winding parts 13 and 14 each are constructed from a plurality of coil sets 15, diagrammatically illustrated in FIG. 2. In the embodiment shown in FIG. 2, each of the winding parts 13 and 14 include five of the coil sets 15, indicated in FIG. 2 as sets 15a, 15b, 15c, 15d and 15e. The coil sets 15, in turn, are constructed from a plurality of individual wire turns. Each of the wire turns include a straight conductor run portion carried in the slots 8 of the stator core, and an end turn portion 16 which extends between successive straight conductor run portions of a particular wire turn. The lamination 5 used in the embodiment of the stator assembly 2 shown in the drawings is a thirty slot lamination. The coil sets 15e, 15d, 15c, 15b and 15a of the winding parts 13 and 14 respectively span six, eight, ten, twelve and fourteen of the teeth 17.

The auxiliary winding 12 also has two physical winding poles, respective poles being delimited by a first winding part 18 and a second winding part 19. Each of the winding parts 18 and 19 are constructed from a plurality of auxiliary coil sets 20. Each of the auxiliary winding parts 18 and 19 include five of the coil sets 20, indicated in FIG. 2 as sets 20a, 20b, 20c, 20d and 20e. The coil sets 20, in turn, also are constructed from a plurality of individual wire turns. The wire turns of the coil sets 20e, 20d, 20c, 20b and 20a are wound over seven, nine, 11, 13 and 15 of the teeth 17. It may be observed, in FIG. 2, that the auxiliary winding 12 is rotated physically 90° with respect to the main winding 10. Consequently, the auxiliary winding 12 and main winding 10 may operate as a conventional two pole winding for the motor 1, giving the motor 1 a first operating speed.

The auxiliary winding 11 has four physical winding poles, respective poles being delimited by winding parts 21, 22, 23 and 24. Each of the winding parts 21 through 24 also are constructed from a plurality of second auxiliary coil sets 25. Each of the second auxiliary winding parts 21 through 24 include three of the coil sets 25, indicated in FIG. 2 as sets 25a, 25b and 25c. The coil sets 25 also are constructed from a plurality of individual wire turns. The wire turns of the coil sets 25c, 25b and 25a respectively are wound over three, five and seven of the teeth 17.

Figures 3, 4:
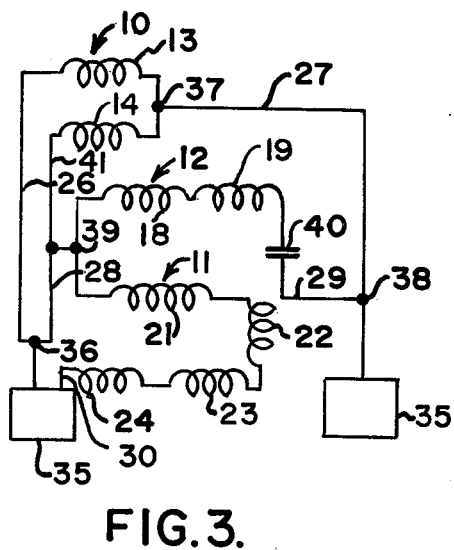
FIG. 3 is a simplified circuit diagram for the windings of FIG. 2, shown in a relationship giving a first motor speed.
FIG. 4 is a simplified circuit diagram for the windings of FIG. 2, shown in a relationship giving a second motor speed.

A termination of the winding parts are connected to a source of electrical energy and other control devices through the use of motor leads. Thus, as shown in FIG. 3, a motor lead 26 is operatively connected to a switch means 35 at a connection point 36. The motor lead 26 also is connected to one side of the winding part 13. The second side of the winding part 13 is connected to a first side of the winding part 14 at a connection point 37. A second side of the winding part 14 is connected to a connection point 39 by a lead 41. The point 39 is connected to the point 36 by a lead 28. A motor lead 27 is operatively connected from the connection point 37 to the switch means 35 through a connection point 38. As thus described, the winding parts 13 and 14 are connected in parallel with one another to provide the two electrical pole main winding 10.

Two speed operation is obtained by connecting the auxiliary winding 12 and a capacitor 40, which are serially connected to one another, between the connection point 39 and the connection point 38 along a motor lead 29. The connection point 38 is electrically connected to the switch means 35. In this configuration, the auxiliary winding 11 is connected electrically to the connection point 39 on a first side of the winding 12, and to a motor lead 30 on a second side of the winding 11. The motor lead 30 is an open circuit at its interconnection with the switch means 35.

When four pole operation of the motor 1 is desired, the switch means 35 is activated so that the motor lead 30 is electrically connected, through switch means 35 activation, to the connection point 38, thereby electrically connecting the winding 11 between the connection points 38 and 39. The motor lead 27 is made an open circuit, through switch means 35 activation, while the motor lead 41 is electrically connected to the connection point 38. The lead 29, and consequently, auxiliary winding 12, is made an open circuit through the switch means 35. In this configuration, shown in FIG. 4, the main winding 10 has a polarity such that it produces two consequent physical poles resulting in four electrical poles in the motor 1 electrical circuit, so that the motor 1 operates as a four pole motor.

The switch means 35 is conventional, and in general may comprise any of a variety of commercially available, conventional switches. It is not described in detail. As indicated above, the five motor leads for the assembly 2 conventionally are connected through a compressor shell, in applications where the stator assembly 2 is adapted for hermetic motor use. Connection may be made through the use of suitable terminal blocks 50, if desired.

Operation of the motor of this invention is relatively easy to understand. The winding 9 is inserted in the stator assembly 2 and the stator assembly is placed in a suitable application. The various motor leads are connected to the switch means 35 through the terminal blocks 50. One position of the switch means 35 connects the winding 9 in the circuit configuration shown in FIG. 3. As there shown, the main winding 10 has its winding parts 13 and 14 connected in parallel, while the auxiliary winding 12 is connected in series between the connection points 39 and 38. The winding parts 18 and 19 of the auxiliary 12 also are displaced physically with respect to the winding parts 13 and 14 of the main winding 10. Consequently, the motor 1 operates as a conventional two pole induction motor.

The second position of the switch means 35 is shown in FIG. 4. In this configuration, the winding parts 13 and 14 are connected in series so that the polarity of the winding parts will produce two consequent physical poles resulting in four electrical poles in the motor 1. The winding parts 21, 22, 23 and 24 of the auxiliary winding 11 are connected in series, the winding being connected between the connection points 39 and 38 in series with the capacitor 40. Again, the electrical poles defined by the winding parts 13 and 14 are displaced physically with respect to the winding parts 21, 22, 23 and 24 of the auxiliary winding 12. In this mode, the motor 1 operates as a four pole induction motor.

It thus may be observed that the motor 1 meets all the end and objects set forth above.

Numerous variations, within the scope of the appended claims, will be apparent to those skilled in the art in light of the foregoing description and accompanying drawings. Thus, the lamination design, number of slots, tooth span and number of turns used in respective windings all may vary in other embodiments of this invention. I have found that the following winding configuration gives adequate motor performance:
Winding 10: 20-20-21-21-28 turns of No. 14 ¾ wire
Auxiliary winding 11: 16-19-20-23-10 turns of No. 17 ¼ wire
Auxiliary winding 12: 26-26-21 turns of No. 16 ½ wire In one test, this winding combination gave the following performance:
Two pole (tested on 230 line volts)
Breakdown torque = 26.7 lb. ft.
Efficiency at 10.6 lb. ft. = 83.6%
Power factor at 10.6 lb. ft. = 99.2%
Locked rotor torque = 13.8 lb. ft.
Locked rotor current = 159 amps
Four pole (tested on 230 line volts)
Breakdown torque = 15.3 lb. ft.
Efficiency at 10.6 lb. ft. = 78.5%
Power factor at 10.6 lb. ft. = 95.5%
Locked rotor torque = 13.3 lb. ft.
Locked rotor current = 51.4 amps While various connection points were set out in the specification, those skilled in the art will recognize that one or more of the connection points set out may be combined in embodiments of this invention and need not appear as actual physical points in those embodiments. The use of the connection point terminology merely facilitates description of the invention. The relative physical location of the windings 10, 11 and 12 may be altered in other embodiments of this invention. These variations are merely illustrative.

Having thus described the invention, what is claimed and desired to be secured by Letters Patent is:

1. An induction motor, comprising:
   a rotor assembly;
   a stator assembly including a core of magnetic material formed from a stack of individual laminations, said core having a central, bore opening in it adapted to receive slots formed in said core, and windings in said slots, said windings including:
   a single main winding defining a first physical motor pole and a second physical motor pole;
   a first auxiliary winding defining a first physical and electrical motor pole and a second physical and electrical motor pole, said first and said second physical motor poles of said first auxiliary winding being rotated physically with respect to the first and second physical poles of said first main winding;
   a second auxiliary winding having twice the number of physical and electrical motor poles as said main winding; and
   means for operatively interconnecting respective ones of said first and said second auxiliary windings with said main winding, said interconnecting means including switch means for electrically connecting said entire main winding and said second auxiliary winding such that the polarity of said main winding produces two consequent physical poles resulting in four electrical poles.

2. The induction motor of claim 1 wherein said motor is intended for use in a hermetic compressor, said stator core being constructed from a plurality of individual laminations, areas of said laminations between adjacent slots defining stator teeth, said main winding being constructed from a plurality of coil sets, respective ones of said coil sets spanning six, eight, 12 and 14 of said teeth.

3. The induction motor of claim 2 wherein said first auxiliary winding is constructed from a plurality of coil sets, respective ones of said coil sets spanning seven, nine, 11, 13 and 15 of said teeth.

4. The induction motor of claim 3 wherein said second auxiliary winding is constructed from a plurality of coil sets, individual ones of said coil sets spanning three, five and seven of said teeth.

5. An induction motor, comprising:
   a rotor assembly;
   a stator assembly adapted to operate in conjunction with said rotor assembly, said stator assembly including motor windings, said motor windings adapted to provide two speed operation of said motor, said winding requiring five leads to interconnect said windings to a source of electrical energy, said windings including:
   a single main winding defining a first physical motor pole and a second physical motor pole;
   a first auxiliary winding having the same number of physical motor poles as said single main winding;
   a second auxiliary winding having twice the number of physical poles as said single main winding; and
   means for operatively interconnecting one of said first and said second auxiliary windings with said main winding, said motor having a first rated speed with said single main winding and said first auxiliary winding energized, and a second rated speed with said single main winding and said second auxiliary winding energized, the polarity of said single main winding being chosen so as to induce twice the number of electrical motor poles as said main winding has physical motor poles when said main winding is operatively interconnected with said second auxiliary winding.

6. The induction motor of claim 5 wherein said motor is intended for use in a hermetic compressor, said stator core being constructed from a plurality of individual laminations, areas of said laminations between adjacent slots defining stator teeth, said main winding being constructed from a plurality of coil sets, respective ones of said coil sets spanning six, eight, twelve and fourteen of said teeth.

7. The induction motor of claim 6 wherein said first auxiliary winding is constructed from a plurality of coil sets, respective ones of said coil sets spanning seven, nine, eleven, thirteen and fifteen of said teeth.

8. The induction motor of claim 7 wherein said second auxiliary winding is constructed from a plurality of coil sets, individual ones of said coil sets spanning three, five and seven of said teeth.

9. A method of providing a two speed motor having three winding sets and five leads for selectively interconnecting winding sets to a source of electrical energy, comprising:
   forming a single main winding having at least two physical motor poles;
   forming a first auxiliary winding having at least the same number of physical motor poles as said single main winding;
   forming a second auxiliary winding having twice the number of physical motor poles as said single main winding; and
   interconnecting said main winding in its entirety with said first auxiliary winding to obtain a first rated motor speed and interconnecting said main winding in its entirety with said second auxiliary winding to obtain a second rated motor speed, the physical poles of said single main winding having a polarity chosen so that the number of electrical motor poles of said single main winding is equal to the number of physical motor poles of said second auxiliary winding whenever said single main winding and said second auxiliary winding are selectively interconnected for motor operation.

10. The method of claim 9 wherein said motor is interconnected to a source of electrical energy through the use of five motor lead wires.

* * * * *

UNITED STATES PATENT AND TRADEMARK OFFICE
CERTIFICATE OF CORRECTION

PATENT NO. : 4,103,212
DATED : July 25, 1978
INVENTOR(S) : Gene V. Spradling

It is certified that error appears in the above—identified patent and that said Letters Patent are hereby corrected as shown below:

In the ABSTRACT, second column, line 8, after "main" delete "inding" and insert --- winding ---.

Column 4, line 17, after "invention" insert

Signed and Sealed this

First Day of May 1979

[SEAL]

Attest:

RUTH C. MASON
Attesting Officer

DONALD W. BANNER
Commissioner of Patents and Trademarks